United States Patent
O'Neil et al.

(10) Patent No.: US 9,544,965 B1
(45) Date of Patent: Jan. 10, 2017

(54) SENSOR LIGHTING CONTROL SYSTEM

(71) Applicants: Tom O'Neil, Gardena, CA (US); Lee Chiang, Gardena, CA (US)

(72) Inventors: Tom O'Neil, Gardena, CA (US); Lee Chiang, Gardena, CA (US)

(73) Assignee: EUCONTROLS CORPORATION

( * ) Notice: Subject to any disclaimer, the term of this patent is extended or adjusted under 35 U.S.C. 154(b) by 0 days.

(21) Appl. No.: 15/151,412

(22) Filed: May 10, 2016

(51) Int. Cl.
  *H05B 33/08* (2006.01)
  *H04L 29/08* (2006.01)
  *H04W 4/00* (2009.01)
  *H05B 37/02* (2006.01)

(52) U.S. Cl.
  CPC ......... *H05B 33/0845* (2013.01); *H04L 67/125* (2013.01); *H04W 4/005* (2013.01); *H05B 33/0809* (2013.01); *H05B 37/0218* (2013.01); *H05B 37/0227* (2013.01); *H05B 37/0272* (2013.01)

(58) Field of Classification Search
  CPC ............ H05B 33/0845; H05B 33/0809; H05B 37/0218; H05B 37/0227; H05B 37/0272; H04L 67/125; H04W 4/005
  See application file for complete search history.

(56) References Cited

U.S. PATENT DOCUMENTS

| | | |
|---|---|---|
| 4,368,406 A | 1/1983 | Kruzich |
| 5,189,383 A | 2/1993 | Murakami |
| 7,155,317 B1 | 12/2006 | Tran |
| 7,167,777 B2 | 1/2007 | Budike, Jr. |
| 7,411,489 B1 | 8/2008 | Elwell |
| 7,791,282 B2 | 9/2010 | Yu |
| 7,969,102 B2 | 6/2011 | Chang |
| 8,018,166 B2 | 9/2011 | Soccoli |
| 8,253,340 B2 | 8/2012 | Paton |
| 8,373,125 B2 | 2/2013 | Ni |
| 8,860,327 B2 | 10/2014 | Choong |
| 8,970,372 B2 | 3/2015 | Primous |
| 2007/0007898 A1 | 1/2007 | Bruning |
| 2014/0125234 A1 | 5/2014 | Sadwick |
| 2015/0102745 A1* | 4/2015 | Pijlman ............ H05B 37/0236 315/291 |

* cited by examiner

*Primary Examiner* — Douglas W Owens
*Assistant Examiner* — Jonathan Cooper
(74) *Attorney, Agent, or Firm* — Clement Cheng

(57) ABSTRACT

A sensor lighting control system comprises a voltage input received from an AC source so as to be an AC voltage input. A voltage output for connection to lamps. A microcontroller controlling the voltage output and powered by the voltage input. A wireless mesh network transceiver connected to the microcontroller, where the wireless mesh network transceiver is configured to communicate with a wireless mesh network that can receive a global remote control and Internet, and the wireless mesh network transceiver is connected to a mesh network coordinator. Passive infrared motion sensors are connected to the microcontroller, where the passive infrared motion sensors include at least three passive infrared motion sensors. An acoustic sensor for detecting environmental acoustics is connected to the microcontroller, where a triggering level of the acoustic sensor is programmable via the mesh network controller to trigger the microcontroller to activate or deactivate the voltage output.

11 Claims, 7 Drawing Sheets

SENSOR LIGHTING CONTROL SYSTEM

FIELD OF THE INVENTION

The present invention is in the field of sensor lighting control systems.

DISCUSSION OF RELATED ART

A variety of different United States patents have discussed varying methods for implementing a sensor lighting control system.

In U.S. Pat. No. 8,970,372 by inventor Primos, entitled Occupancy Sensor With Dimmer Feature And Night Light And Method Of Lighting Control Using The Same, issued Mar. 3, 2015, assigned to Hubbell Inc., an occupancy sensor is disclosed with microcontroller based passive infrared (PIR) occupancy sensor, the disclosure of which is incorporated herein by reference. The output lighting control is leading edge AC phase cut using a TRIAC device.

In U.S. Pat. No. 8,018,166 by inventor Soccoli, entitled Lighting Control System And Three Way Occupancy Sensor, issued Sep. 13, 2009, assigned to Leviton Inc., an occupancy sensor can be connected as a 3-way wiring configuration, the disclosure of which is incorporated herein by reference. The lighting output is dimmable using a leading edge AC phase out using a TRIAC device.

In U.S. Pat. No. 8,275,163 by inventor Bogorad, entitled Automatic Switch Dimmer Device, issued Aug. 14, 2008, assigned to Leviton Inc., the disclosure uses a Pyroelectric (or Passive Infrared, PIR for short) Motion Detector with Microcontroller to control an automatic switch or dimmer device, the disclosure of which is incorporated herein by reference. This automatic switch or dimmer device is an external device (not built-in the motion detector) which is wired in series with the light source.

In U.S. Pat. No. 4,368,406 by inventor Kruzich, entitled Lamp Dimmer Control With Integral Ambient Sensor, issued on Jan. 11, 1983, assigned to Ford Motor Company, the disclosure is a Photosensor to detect ambient light level to turn ON or OFF or dim with Pulse Width Modulation (PWM) in 12 VDC automotive application, the disclosure of which is incorporated herein by reference.

In United States patent number 20140125234 by inventor Sadwick, entitled Dimmer with Motion and Light Sensing, the disclosure has motion sensors and photosensors to turn ON or OFF a lighting device with 0-10 VDC dimming, in conjunction with wired or wireless controls, the disclosure of which is incorporated herein by reference.

In U.S. Pat. No. 5,189,383 by inventor Murakami, entitled Circuit Element Utilizing Magnetostatic Wave, issued on Feb. 23, 1993, assigned to Hitachi Metals Ltd, the "expired" disclosure has dual sensor technology in Infrared and Ultrasonic technologies, the disclosure of which is incorporated herein by reference. The light output control is a mechanical relay turns AC power source ON or OFF. There is no dimming control.

In U.S. Pat. No. 7,155,317 by inventor Nhan Tran, entitled Occupant Counter Control Switch For Automatic Turning On And Off Electrical Appliances In A Room, issued on Dec. 26, 2006, assigned to Nhan Tran, the disclosure uses dual sensor technology in Infrared and Photosensor technologies, the disclosure of which is incorporated herein by reference. The light output control is a mechanical relay that turns the AC power source ON or OFF. There is no dimming control.

In U.S. Pat. No. 7,411,489 by inventor Elwell, entitled Self-Adjusting Dual Technology Occupancy Sensor System And Method, issued on Aug. 12, 2008, assigned to Cooper Wiring Devices Inc., the disclosure is a dual sensors infrared and ultrasonic motion sensor, the disclosure of which is incorporated herein by reference. The light output control is a mechanical relays toggle AC power source ON or OFF. There is no dimming control.

In U.S. Pat. No. 7,791,282 by inventor Yu, entitled Motion Sensor Switch For 3-Way Light Circuit And Method Of Lighting Control Using The Same, issued on Sep. 7, 2010, assigned to Hubbell Inc., the disclosure is a 3-way occupancy sensor switch, the disclosure of which is incorporated herein by reference. The lighting device AC power source is controlled by one or two (if 3-way wiring is used) mechanical relay, no dimming capability.

In U.S. Pat. No. 8,253,340 by inventor Paton, entitled Daylight Control System, Device And Method, issued on Aug. 28, 2012, assigned to Watt Stopper Inc., the disclosure has a photosensor to detect ambient light level to turn ON or OFF of the AC power source to save electricity, the disclosure of which is incorporated herein by reference. The lighting device AC power source is controlled by a mechanical relay, no dimming capability.

In U.S. Pat. No. 8,373,125 by inventor Ni, entitled Occupancy Detector Switch, issued on Feb. 2, 2013, assigned to Wenzhou MTLC Electric Appliances, the disclosed is an infrared sensor occupancy sensor, the disclosure of which is incorporated herein by reference. The lighting device AC power source is controlled by a mechanical relay, no dimming capability.

In United States patent number 20070007898 by inventor Bruning, entitled Integrated Lamp With Feedback And Wireless Control, issued on Jan. 11, 2007, assigned to Koninklijke Philips NV, the disclosure uses an integrated RF remote controlled LED lamp fixture, the disclosure of which is incorporated herein by reference. Bruning does not disclose a global mesh network remote control system.

In U.S. Pat. No. 7,969,102 by inventor Chang, entitled Interactive LED Lighting System For Entertainment And Network Thereof, issued on Jun. 28, 2011, assigned to Chang, the disclosure has remote control LED in red/green/blue (RGB) color LED to mix mixed LED lighting colors for entertainment environment, the disclosure of which is incorporated herein by reference. It is different than our sensor lighting control using same Mesh Network.

In U.S. Pat. No. 8,860,327 by inventor Choong et al, entitled Wireless Adaptation Of Lighting Power Supply, issued on Oct. 14, 2014, assigned to Daintree Networks Pty Ltd, it is Daintree Network's own patent emphasized on the ZigBee/Daintree network protocols, the disclosure of which is incorporated herein by reference. Choong does not disclose a sensor lighting system with a AC Phase cut dimming and a mesh network remote control.

In U.S. Pat. No. 7,167,777 by inventor Budike Jr., entitled Wireless Internet Lighting Control System, issued on Jan. 23, 2007, assigned to Powerweb Technology, the disclosure is intended for "lighting ballast" in Fluorescent lamps application, the disclosure of which is incorporated herein by reference.

SUMMARY THE INVENTION

A sensor lighting control system (SLC System) has passive infrared (PIR) sensors, a photosensor, an acoustic sensor and has a built-in dimmer in either leading-edge (LE) or trailing edge (TE) AC phase cut configuration, housed in a single housing and having a mesh network remote control design. Firmware installed in the microcontroller can sense environmental conditions to turn lights off or dim down to 50% luminance or less, which instantly can comply with California's Title 24 2013 (CA T24 2013) Building Energy Efficiency Standard to save Electricity energy that went into effect in 2014.

Many sensor lighting control systems sold on the market today. Many of them use simple relays, including mechanical or electronic solid state relays to control lighting output on or off without a dimming function. Some sensor lighting control systems use industrial standard 2-wires 0-10 VDC dimming, which requires a separate 0-10 VDC dimming circuitry and wiring or soldering of low voltage small 20 AWG or thinner wires. The traditional trained and local ordinance certified building electricians only work on high power AC wiring on 18 AWG or thicker wires, using wire strippers and screw drivers. It would be too difficult for them to wiring or solder small 20 AWG or thinner wires, and install 0-10 VDC control circuitry. Some sensor lighting control systems use external AC phase cut dimmers to achieve a dimming function. Most popular AC dimmers are leading-edge LE phase cut dimmers or known as TRIAC dimmers, which are low cost but generate electromagnetic interference and are harsh for capacitive load lighting devices due to the AC voltage being turned on quickly by the TRIAC, and having a high inrush current.

External AC dimmers in trailing edge phase cut are available in Electronics Low Voltage (ELV) dimmers, but the cost is significantly higher and most users are not willing to use them. However, the TE Phase Cut dimmers have many advantages such as low EMI, due to they turn ON smoothly following AC sine wave rising voltage. The TE Phase Cut dimmers are user friendly, especially for the LED lighting fixtures which is more popular from now on and future.

Some lighting control systems use built-in TRIAC or LE AC dimmer to save manufacturer cost, but there is no built-in TE AC dimmers in the same package. Most lighting control systems, especially manufactured pre-2013 models, has only 1 non-dimmable circuitry and they will not comply with CA 24T 2013 Building Energy Efficiency Standard.

Many lighting control systems have no remote control capability. The user must use manual adjustment potentiometers to change desired settings. Many lighting control systems have remote controls in local direct line-of-sight short distance, such as battery operated handheld Infrared (IR) in 1-way communication from remote control to the system only. Some systems have 2-way IR remote controls, but the remote controls need expensive display screen for machine-to-human interface so that the users can read the system's internal settings.

Some systems have Radio Frequency (RF) battery operated handheld remote control in either popular 435 MHz, 915 MHz or 2.4 GHz frequencies. However, they are also in local direct line-of-sight short distance. They are either 1-way communication, or 2-way communication which need expensive display screen for machine-to-human interface so that the users can read the system's internal settings.

The disclosed invention here has combined all the advantages of sensor lighting control systems, and present a low cost solution with Sensors, built-in AC Phase Cut dimmer in both LE and TE for easy Electricians wiring to comply CA 24T 2013 Building Energy Efficiency Standard. It has a built-in Mesh Network approved ZigBee module, which enables global 2-way communication via Internet services and an Access Point device or a Mesh Network enabled router. The SLC system can be accessed from anywhere Internet services are available and using a portal website on the Internet browser program. The users have advantages of graphic visual on computer screen or handheld devices (Smart Phones, Tablets etc) for the existing system's internal settings, as well as the proposed new settings just before send the update command.

A sensor lighting control system comprises a voltage input received from an AC source so as to be an AC voltage input. A voltage output for connection to lamps. A microcontroller controlling the voltage output and powered by the voltage input. A wireless mesh network transceiver connected to the microcontroller, where the wireless mesh network transceiver is configured to communicate with a wireless mesh network that can receive a global remote control and Internet, and the wireless mesh network transceiver is connected to a mesh network controller. Passive infrared motion sensors are connected to the microcontroller, where the passive infrared motion sensors include at least three passive infrared motion sensors. An acoustic sensor for detecting environmental acoustics is connected to the microcontroller, where a triggering level of the acoustic sensor is programmable via the mesh network controller to trigger the microcontroller to activate or deactivate the voltage output.

A photosensor for detecting ambient environmental lighting, where the photosensor is connected to the microcontroller. A dimmer configured to receive both a leading edge AC phase cut and a trailing edge AC phase cut to produce at or below 50% dimming output, where the dimmer is connected to the microcontroller, and firmware is programmed on the microcontroller, where the firmware is configured to activate the voltage output when passive infrared motion sensors are triggered, where the voltage output is dimmed by the dimmer in either a leading edge AC phase cut or a trailing edge AC phase cut LE depending on dimming settings, where the firmware is programmed to activate the acoustic sensor only after the PIR sensors are activated, where the acoustic sensor has a triggering threshold level that is programmable via the mesh network controller.

The mesh network transceiver of the sensor lighting control system is a ZigBee mesh network control module configured to communicate with the wireless mesh network. The ZigBee mesh network control module is configured to interpret a received dimming level command code and output the ACL-ON signal to turn ON or OFF the built-in AC phase cut MOSFETs to dim the lighting device circuit in either a leading edge forward phase or trailing edge reverse phase mode, where the firmware is programmed in the microcontroller memory on the mesh network. The mesh network control module has a mesh network control module firmware configured to interpret a received minimum or lower LED dimming level command code, and to deactivate the AC phase cut dimmer at a present dimming state to avoid flickering. The mesh network control module and proprietary firmware calibrates an AC phase cut dimming curve which includes a linear, logarithmic, exponential, or S-Curve type AC phase cut dimming curve.

Firmware can be calibrated for smooth fade in and fade out special effects when changing the AC phase cut dimming luminance level from one level to another. The mesh network transceiver has a built-in identification which is a media access control address programmed into the internal ZigBee chip to provide a very high security system. The mesh network further includes a wireless range extender, where the wireless mesh network has redundant and dynamic topology. The dimmer is controlled by a different firmware timing to select an AC start no conduction for a leading edge phase cut, or an AC start in conduction for a trailing edge phase cut of each AC half-cycle. The dimmer is implemented by a pair of N-Channel MOSFET's in opposing connection as Q4 and Q5 and where the voltage input is connected to a top MOSFET drain electrode with a top MOSFET source electrode connected to a bottom MOSFET source electrode in an opposing connection, where a bottom MOSFET drain is connected between the voltage input and an AC neutral power source, and where the pair of N-Channel MOSFET's are configured so that when a pair of MOSFET's gate electrodes are turned on or off at a proper timing, the AC current will pass through one MOSFET drain to source normal conduction path, and the other MOSFET will be bypassed via a built-in reverse body diode from a source electrode as anode to a drain electrode as a cathode. The dimmer only requires a neutral and an AC source, without no additional wiring.

Figure 1:
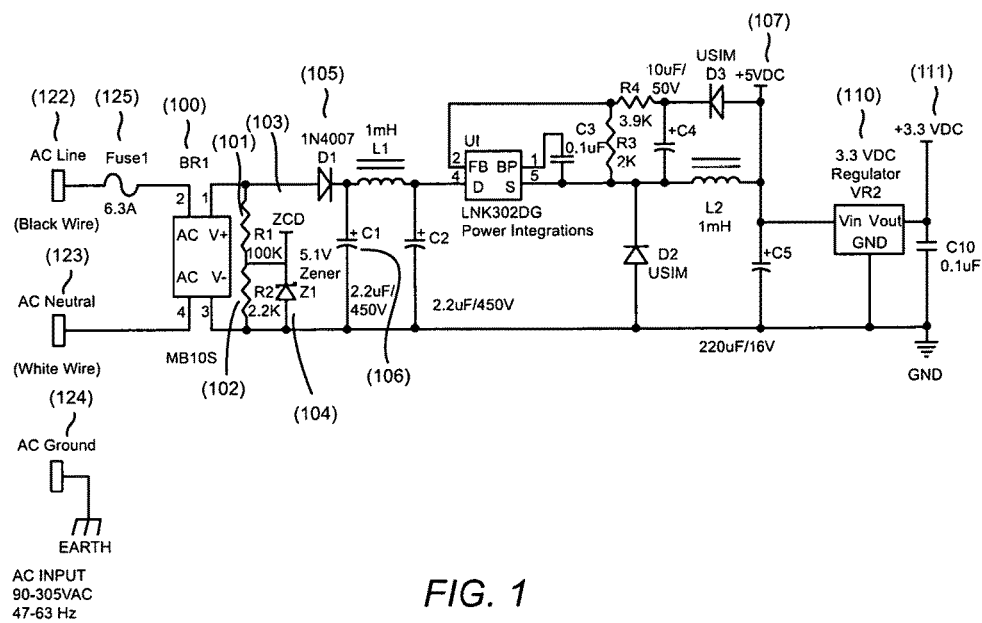
FIG. 1 is an AC Input and low voltage DC power source circuit diagram.

The following callout list of elements can be a useful guide in referencing the element numbers of the drawings.
122 AC input voltage AC Line
125 Fuse 1
123 AC Neutral
100 Bridge Rectifier BR1
124 AC Ground
101 Resistor R1
102 Resistor R2
103 ZCD (Zero Current Crossing Detector)
200 Microcontroller U2
104 5.1V Zener Diode Z1
105 Diode D1
106 Capacitor C1
107 +5 VDC power source
111 +3.3 VDC power source
110 linear regulator VR2
202 push button switch SW1
207 wireless Mesh Network Module U3, abbreviated as wireless module U3
209 Serial Data SDA
208 Serial Clock SCL
201 Output Port P0.2 named ACL-ON
203 Output Port P0.0 named LED-out
503 Red LED Named LED1
206 Input Port P5.4 on pin-13 named Acoustic-in
205 input port P4.0 on pin-14 named PIR
204 input port P4.1 on pin-15 named Photo-in
301 Microphone named Mic1
302 controller chip U4
401 PIR sensor PIR1
402 PIR sensor PIR2
403 PIR sensor PIR3
404 OpAmp U4
501 ambient lighting photosensor named PS1
503 red LED named LED1
601 low power isolated transformer T1
602 Diode D4
603 current limiting resistor R61
604 capacitor C61
605 12V Zener Z2
606 isolated power source 12 VDC-ISO
612 isolated ground GND-ISO
607 U5 Optoisolator
608 N-CH MOSFET Q4
609 N-CH MOSFET Q5
610 AC LINE Dimming by Phase Cut ACL-Dim
611 lighting device circuit
701 wireless Mesh Network LAN station 1
702 wireless Mesh Network LAN station 2
703 first antenna path
704 second antenna path
705 third antenna path
706 wired Ethernet cables
707 Internet Access WAN
708 Wireless Mesh Network Coordinator
709 Fourth Antenna Path
710 Fifth Antenna Path

DETAILED DESCRIPTION OF THE PREFERRED EMBODIMENT

The following glossary can be a useful guide in interpreting the abbreviations of the specification.

ZCD stands for zero current detector or zero crossing detector. Oftentimes it is important to find where a sinusoidal signal crosses over from positive to negative voltage or from positive to negative current. The zero crossing detector can deliver an output pulse for example to provide an indication of zero crossing.

AC stands for alternating current. Alternating current often has a sinusoidal output.

DC stands for direct current. Direct current does not have a sinusoidal varying output.

VDC stands for volts of direct-current.

A mesh network is a decentralized network.

ZigBee™ a popular wireless Wi-Fi transmission transceiver module

SCL stands for serial clock line

GUI stands for graphical user interface

SDA stands for serial data

I2C stands for inter-integrated circuit, which is a multi-master multi-slave single ended serial computer bus protocol PC stands for personal computer PIR passive infrared AC phase cut dimmer is a dimmer that communicates using cuts made to AC phase SLC System is a sensor lighting control system Zener is an abbreviation for Zener a diode, which is a diode that allows current to flow when a reverse Zener voltage is reached Optoisolator is an optical coupler that uses a short optical transmission path to deliver an electrical signal between circuits N-CH MOSFET stands for an N-Channel metal-oxide-semiconductor field-effect transistor Source Electrode an electrode of a transistor receiving a source current Drain Electrode an electrode of a transistor dispensing the source current LE stands for a leading-edge of a wave
TE stands for a trailing edge of a wave
LED stands for a light emitting diode
MAC Address stands for Media Access Control Address, which is a unique address
HID stands for high-intensity discharge, which is a type of lamp
ELV stands for Electronics Low Voltage
RF stands for Radio Frequency FIG. 1 shows the AC Input and low voltage DC power source circuitry. The AC input voltage AC Line (122) passing through a fuse named Fuse1 (125) and AC Neutral (123) is rectified by Bridge Rectifier BR1 (100). AC Ground (124) is connected to the metal case to protect users from electric shock. The signal is scaled down by a pair of resistors R1 (101) and R2 (102), and sampled for "zero current crossing" ZCD (103). This ZCD signal is used for the Microcontroller U2 (200) input port P0.3 on pin-4 to detect the AC voltage crossing 0 volts for AC Phase Cut dimming control. The 5.1V Zener Diode Z1 (104) protects the ZCD signal from overvoltage to damage Microcontroller U2 (200). The Diode D1 (105) isolates the DC voltage across filtering capacitor C1 (106), so that the ZCD signal (103) will go close to 0 volt.

An Off-Line switcher circuit converts AC input power 120-277 VAC, 47-63 Hz to a low voltage +5 VDC power (107). The +5 VDC power source (107) powers up the Microcontroller U2 (200) with proprietary firmware to control the system. Whenever the AC input power source is present, the +5 VDC (107) is available. A +3.3 VDC power source (111), is regulated from the +5 VDC (107) by a linear regulator VR2 (110).

Figure 2:
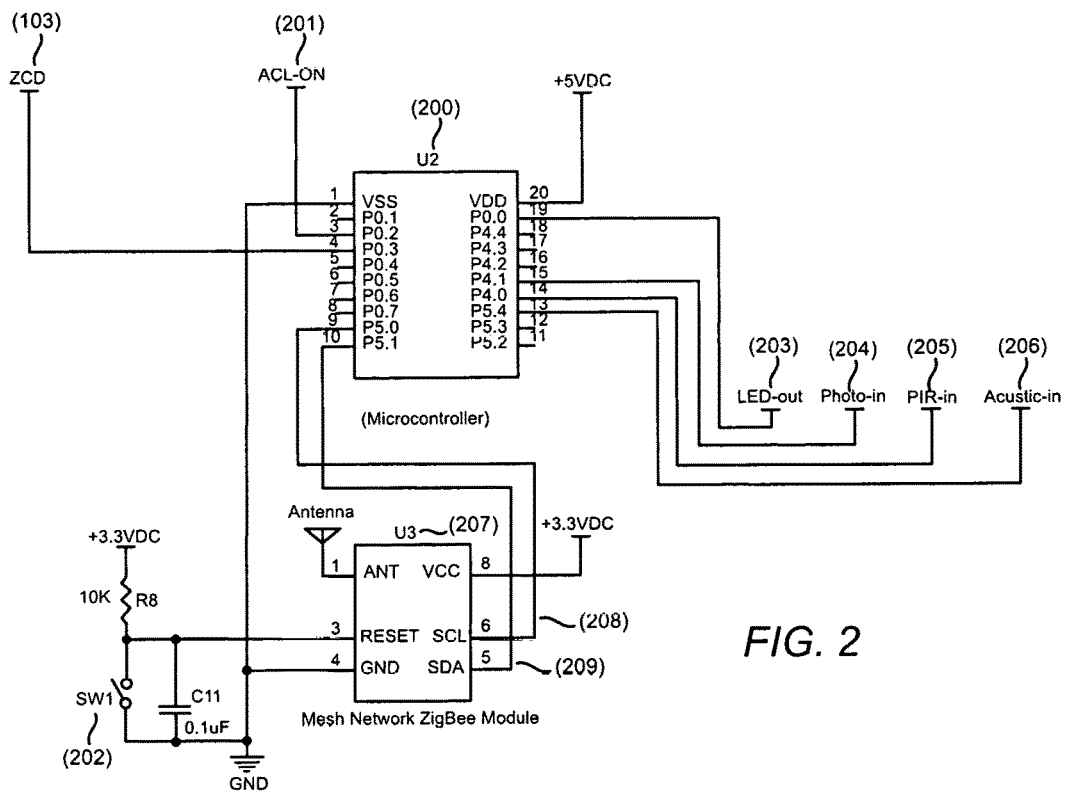
FIG. 2 is a circuit diagram of a microcontroller and mesh network ZigBee Module.

A plurality of ZigBee™ Wi-Fi transmission receiver modules or other kinds of wireless transceiver modules can be wirelessly connected for creating a mesh network such that each of the Wi-Fi transceiver modules are part of the mesh network. FIG. 2 shows a microcontroller and mesh network ZigBee Module section of the present invention. A push button switch SW1 (202) is connected to a wireless ZigBee module U3 (207) RESET pin-3. The pushbutton switch can signal the wireless ZigBee module U3 (207) to synchronize with the wireless access point device which is a mesh network enabled router. The commercially available wireless mesh network ZigBee™ Module U3 includes a ZigBee™ compliant firmware unit soldered on the main PC board which transforms the SLC system into a wireless mesh network controller.

This wireless mesh network controller runs on the +3.3 VDC power source with its own microcontroller with a built in wireless module U3 (207) and an antenna.

The user can read and modify the system settings data remotely on a computer screen running a portal browser linked to a graphical user interface (GUI). The commands and data are transmitted and received wirelessly by the mesh network controller, they are sent to or received from the main microcontroller U2 (200) via 2-wires communication on the PC board in I2C communication protocol. The serial data SDA (209) is to connected to the microcontroller U2 (200) Port P5.1 on pin-10. The serial clock line SCL (208) is to connected to the microcontroller U2 (200) port P5.0 on pin-9.

The microcontroller has an output port P0.2 named ACL-ON (201) to control the built-in AC phase cut dimmer. The microcontroller has an output port P0.0 named LED-out (203) to blink a red LED named LED1 (503) for human acknowledgement whenever the PIR sensors detect any motion. The microcontroller also has an input port P5.4 on pin-13 named Acoustic-in (206), which is the acoustic sensor input signal. The microcontroller has an input port P4.0 on pin-14 named PIR-in (205), which is the PIR sensor input signal. The microcontroller also has an input port P4.1 on pin-15 named Photo-in (204), which is the Photosensor input signal.

Figure 3:
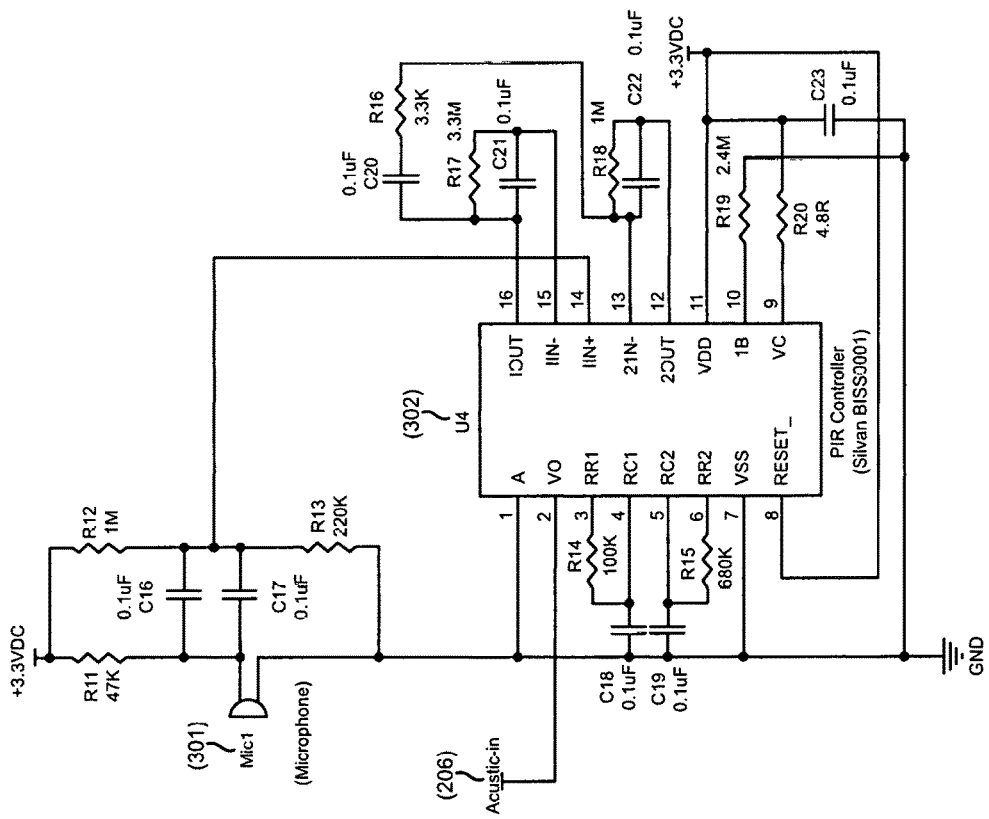
FIG. 3 is a circuit diagram of an acoustic sensor.

FIG. 3 shows the acoustic sensor circuit. The microphone named Mic1 (301) can pickup the acoustic noise nearby, and it is processed by a controller chip U4 (302). The output signal named Acoustic-in (206) is fed to the Microcontroller U2 (200) for further signal processing.

The PIR sensors are installed on a raised daughterboard. The sensors are elevated into the plastic "Dome". The dome is a semispherical plastic cover at center of the package. The dome is infrared and visible light permeable and acts as a lens to redirect light toward the sensors. The raised daughterboard can increase the sensitivity of these sensors by raising the sensor above a level of the main PC board.

Figure 4:
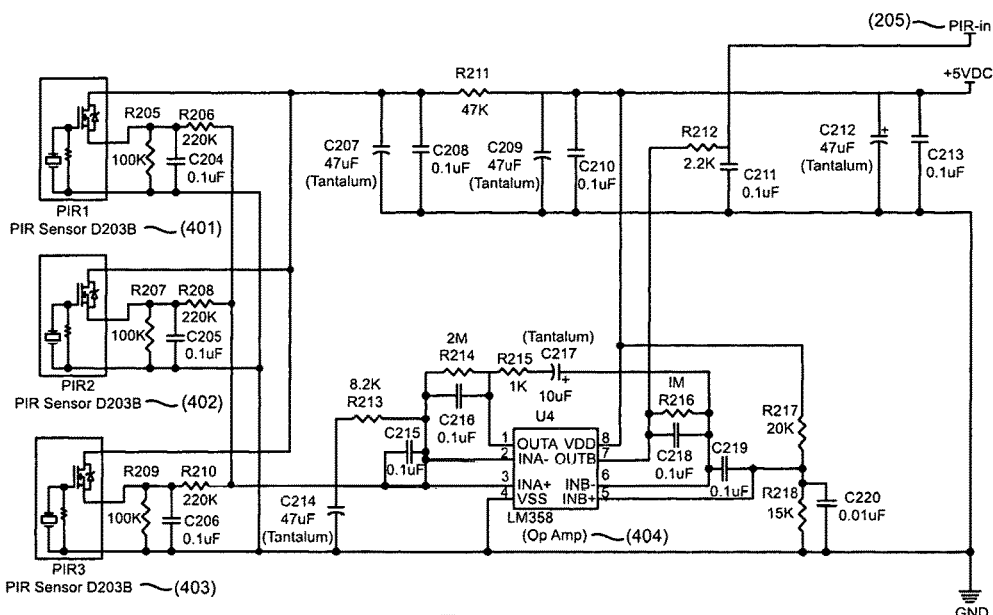
FIG. 4 is a circuit diagram of a passive infrared sensor circuit.

FIG. 4 shows the passive infrared (PIR) sensor circuit. The PIR sensors PIR1 (401), PIR2 (402) and PIR3 (403) are installed at 120 degrees angles to each other to form a full 360 degrees of infrared detection. There 3 PIR sensor's output are connected together, and amplified by an OpAmp U4 (404). These 3 PIR sensors are used as "Motion Detector" to sense any occupants moving in vicinity. If occupants are nearby and moving, the PIR sensors will pick up body heat as infrared light signals to trigger the microcontroller U2 (200) firmware to turn on the lighting device by turning on the lighting circuitry using the built-in AC phase cut dimmers. For example, the dimming level could be set at 50% or lower to comply with the California Title 24 2013 (CA T24) Building Energy Efficiency Standard. The sensitivity of the PIR sensors could also be adjusted remotely by portal program of the web browser.

If occupants are present but not moving, the acoustic sensor can detect occupants. The acoustic sensor is a small microphone Mic1 (301) trying to listen for occupants. The acoustic sensor Acoustic-in (206) signal is ignored by the firmware until the PIR sensors first detect infrared signals from occupants. Then the Microcontroller U2 (200) begins to read the acoustic sensor for occupant activity. This feature has multiple functions. If dimming is desired, the AC phase cut dimming level can be programmed at 50% or below. When users require full luminance, they can make acoustic noise, such as clapping their hands or knocking on a wall or table to activate the acoustic sensor to trigger the built-in dimmer to turn full or max luminance. If dimming is not desired and the AC phase cut dimming level is set in the programming to be higher than 50% or full luminance, the acoustic noise triggered can restart the PIR delay timing and thus keep the lighting on continuously until the PIR delay time has lapsed from inactivity.

When occupants approach the SLC System, the PIR sensors (401, 402, 403) will detect and turn on the lighting circuit via the built-in AC Phase Cut dimmers for the automated light turning on function. There is a user adjustable "timeout" data from 10 seconds to 30 minutes in the Microcontroller U2 (200) memory, which can be read and write back remotely via the Mesh Network.

If there is no motion detected by PIR sensors (401, 402, 403), or no sounds detected by the acoustic sensor Mic1 (301) and the selected timeout has elapsed, the Microcontroller U2 (200) will turn off or dim the lighting circuitry to save energy. The dimming level is also adjustable from 50% to minimum 5%, and then full OFF. The user can adjust the "Dim" data in the Microcontroller U2 (200) memory, which can be read and write back remotely via the Mesh Network.

Before the selected timeout has elapsed, if any of the PIR sensors (401, 402, 403) or the acoustic sensor Mic1 (301) is triggered by infrared or by acoustic sounds, the timeout counter is reset by the firmware of the Microcontroller U2 (200) and the timeout countdown process will restart. Resetting the timeout counter keeps the lighting circuit powered on continuously, until the next timeout elapses due to inactivity.

Figure 5:
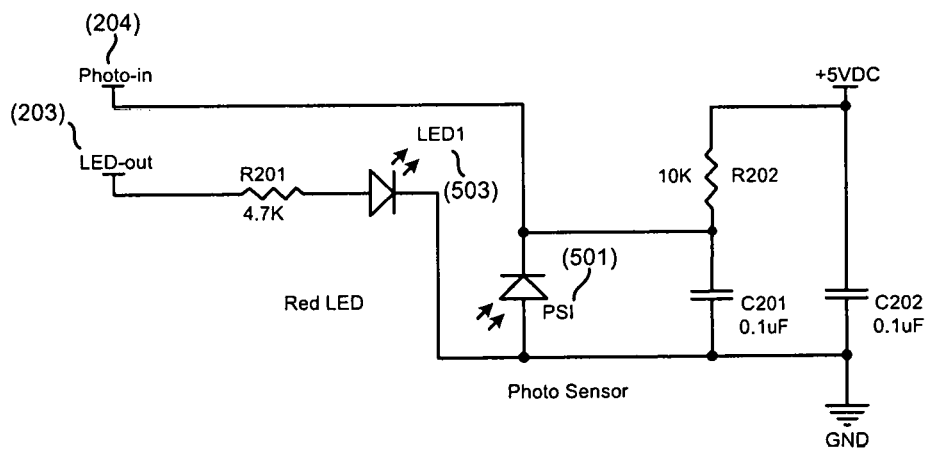
FIG. 5 is a circuit diagram of the ambient lighting photosensor configuration.

FIG. 5 shows the ambient lighting photosensor named PS1 (501), which senses nearby ambient visible light. The ambient lighting photosensor PS1 (501) is normally used to detect daylight. During daytime high ambient light, the Microcontroller U2 (200) reads the photosensor PS1 (501) signal Photo-in (204) to turn off the lighting circuit when the ambient light level is high enough to save energy. A user adjustable "LUX" data varies from 10 LUX to 2000 LUX in the Microcontroller U2 (200) memory, which can be read and write back remotely via the Mesh Network.

A red LED named LED1 (503) can be turned on or off by the Microcontroller U2 (200) on port P0.0 on pin-19 named LED-out (203). The red LED is programmed to blink in a short pulse whenever any PIR sensor detects motion. The red LED provides a visual indicator confirming that the PIR sensors are detecting motion.

Figure 6:
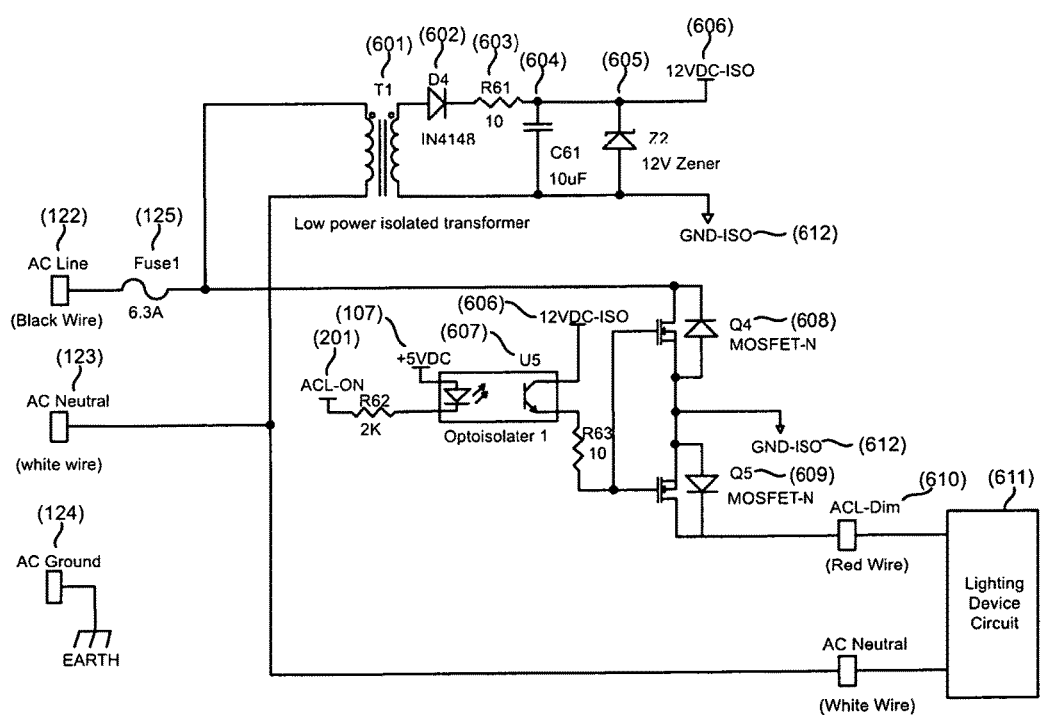
FIG. 6 is a circuit diagram of the built in AC phase cut dimmer.

A built in AC phase cut dimmer is shown in FIG. 6. The AC input voltage AC Line (122) passes through a fuse named Fuse1 (125) and AC Neutral (123) which are then connected to a low power isolated transformer T1 (601). The output is rectified by a Diode D4 (602), a current limiting resistor R61 (603), filtered by a capacitor C61 (604), and then clamped by a 12V Zener Z2 (605) to generate an isolated power source 12 VDC-ISO (606) and the isolated ground GND-ISO (612).

At initial power up, the firmware reads the time between the two incidences of the zero current detection signal ZCD (103), which is exactly half of the AC input period. The firmware can read this time difference several times over several cycles to confirm the AC input frequency, which is 60 Hz and 50 Hz commonly, or from 47 Hz to 63 Hz from other AC power sources.

The Microcontroller U2 (200) can output the ACL-ON (201) to logic "1" or 5 volts, then the U5 Optoisolator (607) output will turn OFF both N-CH MOSFET Q4 (608) and Q5 (609). The lighting device circuit (611) will have no AC Line power source to turn it on.

During the positive half of the AC cycle, AC Line (122) has a higher voltage than AC Neutral (123). The Microcontroller U2 (200) can output the ACL-ON (201) to logic "0" or 0 volt, then the U5 Optoisolator (607) output will turn ON N-CH MOSFET Q4 (608). The current comes from AC Line (122), and then passes through N-CH MOSFET Q4 (608) from the Drain Electrode to the Source Electrode. The N-CH MOSFET Q5 (609) will not conduct current from the Drain Electrode to the Source Electrode because the voltage is reversed. However, the current will bypass the N-CH MOSFET Q5 (609) via the internal "body diode", and then go to the lighting device circuit (611).

During the negative half of the AC cycle, AC Line (122) has a lower voltage than AC Neutral (123). The Microcontroller U2 (200) can output the ACL-ON (201) to logic "0" or 0 volt, then the U5 Optoisolator (607) output will turn ON N-CH MOSFET Q5 (609). The current comes from AC Neutral (123) and then passes through Lighting Device Circuit (611), then N-CH MOSFET Q5 (609) from the Drain Electrode to the Source Electrode. The N-CH MOSFET Q4 (608) will not conduct current from the Drain Electrode to the Source Electrode due to the voltage being reversed. However, the current will bypass the N-CH MOSFET Q4 (608) via the internal "body diode", before passing to the AC Line (122).

The microcontroller can modulate, or change the ACL-ON (201) signal between logic "0" and "1" within every half AC cycle. The AC Phase Cut can be programmed in either leading edge LE mode or trailing edge TE mode, at any point of the half AC Cycle. Also, both a leading edge LE style or trailing edge TE style can be used simultaneously in a simultaneous mode.

To run the AC Phase cut dimmer in LE mode, the ACL-ON (201) signal is turned to logic "1" or 5 volts first at the beginning of each half-cycle of AC. Both MOSFET Q4 (608) and Q5 (609) are turned OFF, and no AC power source is going through the Lighting Device Circuitry (611). This is the Leading Edge phase cut. When the AC phase reached the predetermined Phase Angle, saved in Microcontroller U2 (200) memory, the ACL-ON (201) signal is turned to logic "0" or 0 volt, to turn ON MOSFET Q4 (608) during the positive AC half-cycle, or turn ON MOSFET Q5 (609) during the negative AC half-cycle.

To run the AC phase cut dimmer in TE mode, the ACL-ON (201) signal is set to logic "0" or 0 volts at the beginning of each AC half-cycle. This will turn on MOSFET Q4 (608) during the positive AC half-cycle, or turn ON MOSFET Q5 (609) during the negative AC half-cycle. The AC power will pass through the lighting device circuitry (611) at beginning of each half-cycle of AC. When the AC phase reaches the predetermined phase angle setting, as saved in the microcontroller U2 (200) memory, the ACL-ON (201) signal is changed to logic "1" or 5 volts, which turns OFF both N-CH MOSFET Q4 (608) and Q5 (609). This is the Trailing Edge phase cut, and no AC power source is going through the lighting device circuitry (611) for the remaining half-cycle of the AC.

The predetermined AC phase angle turns ON or OFF the MOSFETs according to the dimming data saved in the Microcontroller U2 (200) memory. The dimming data can be read and write back remotely via the mesh network. The PIR or motion sensor has some typical control parameters, such as the time delay if no motion is detected before turn off the lighting device, or dimming levels and ambient light intensity for the photosensor. All these data can be read and write back remotely via the mesh network on the portal program computer screen. The SLC system is fully controllable remotely via the mesh network.

Figure 7:
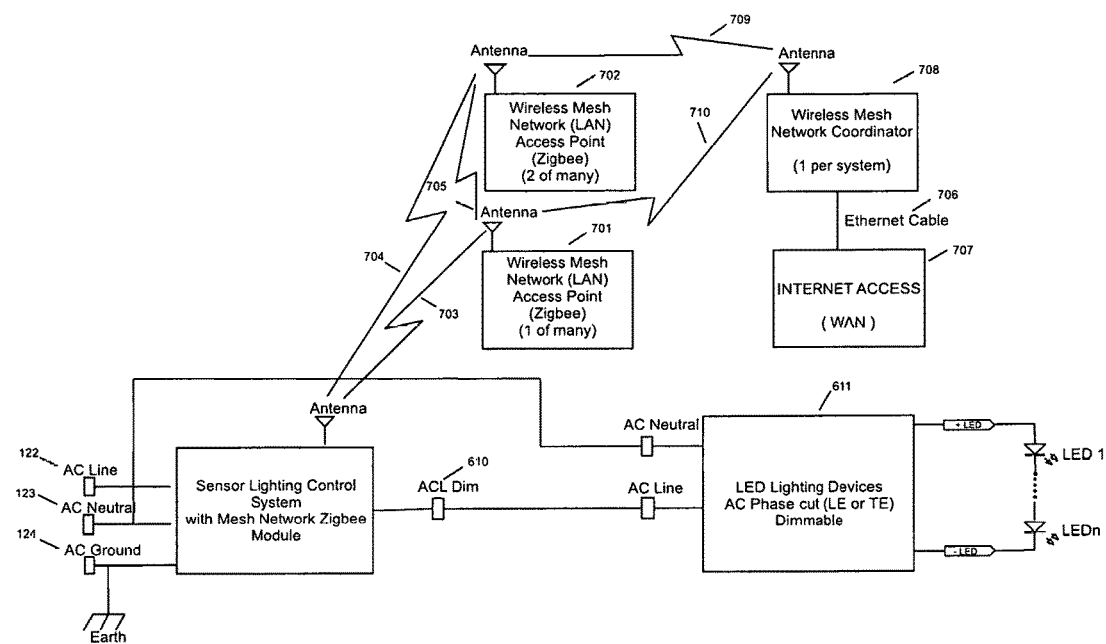
FIG. 7 is a schematic diagram of the Mesh Network configuration.

The firmware is programmed to communicate with the internet via one or more wireless mesh network local area network (LAN) access point(s) or commonly known as routers, as shown in FIG. 7. The mesh network system is used to take advantage of mesh network topology, such as providing multiple channel connections to avoid disconnection if one or more "relay stations" is off-line or broken. The mesh network can extend the wireless transmission range using the built-in relay station function. The mesh network can resiliently and automatically re-configure itself if stations are dropped out or added etc. This invention accommodates the mesh network system. While FIG. 7 only shows a pair of wireless mesh network LAN stations (701) and (702), other mesh network LAN stations are implied. During implementation there would likely be more than a pair of mesh network LAN stations, as they can be added as needed.

The wireless mesh network LAN number 1 (701) communicates with the SLC system as an endpoint device wirelessly via a first antenna path (703). The wireless mesh network LAN number 2 (702) communicates with the SLC system wirelessly via a second antenna path (704). The wireless mesh network LAN number 1 (701) and wireless mesh network LAN number 2 (702) can communicate wirelessly with each other via a third antenna path (705). If more wireless mesh network stations exist, they can all communicate with each other and the SLC system.

All of the wireless mesh network stations are connected to a unique Mesh Network Coordinator (708) of the system, via wireless fourth antenna path (709) and fifth antenna path (710). The Mesh Network Coordinator (708) is then connected to an Internet wide area network WAN (707), usually via wired Ethernet cables (706) as shown. However, the Internet connection of the wireless mesh network coordinator (708) is not limited by wired cable such as Ethernet cable. Other wired media could be used, such as coaxial cable from cable internet service companies or from other communication cables. It also could be another wireless communication channel, such as satellite internet services. The mesh network transceiver can communicate with a local area network Local Area Network (LAN) computer or an Internet cloud based system via an Access Point device which is ZigBee Mesh Network compliant.

The operator can control the SLC system via a graphical user interface (GUI) software program on any remote or local locations via live Internet service (not shown in FIG. 7). The GUI software is capable of connecting the SLC system via internet, and give commands such as an increase or a decrease of the LED luminance level, such as to turn off or lower to a minimum luminance level to avoid LED flickering at very low luminance.

The built-in AC Phase Trailing Edge dimmer has the advantages of no high input surge current for "capacitive" load circuitry for LED Drivers or other Electronics, as the AC voltage starts from near 0 volts and rise smoothly as the AC voltage rises, and produces much less surge current and less Electro-magnetic Compatibility (EMC) noise problems which enables more electronics lighting devices per application, including the most popular LED Drivers or LED lamps and electronic ballasts for fluorescent lamps and high intensity discharge (HID) lamps, or older style incandescent lamps.

The invention claimed is:

1. A sensor lighting control system comprising:
   a. a voltage input received from an AC source so as to be an AC voltage input;
   b. a voltage output for connection to lamps;
   c. a microcontroller controlling the voltage output and powered by the voltage input;
   d. a wireless mesh network transceiver connected to the microcontroller, wherein the wireless mesh network transceiver is configured to communicate with a wireless mesh network that can receive a global remote control and Internet, wherein the wireless mesh network transceiver is connected to a mesh network coordinator;
   e. passive infrared motion sensors connected to the microcontroller, wherein the passive infrared motion sensors include at least three passive infrared motion sensors;
   f. an acoustic sensor for detecting environmental acoustics connected to the microcontroller, wherein a triggering level of the acoustic sensor is programmable via the mesh network controller to trigger the microcontroller to activate or deactivate the voltage output;
   g. a photosensor for detecting ambient environmental lighting, wherein the photosensor is connected to the microcontroller;
   h. a dimmer configured to receive both a leading edge AC phase cut signal and a trailing edge AC phase cut signal to produce an at or below 50% dimming output, wherein the dimmer is connected to the microcontroller; and
   i. a firmware programmed on the microcontroller, wherein the firmware is configured to activate the voltage output when the passive infrared motion sensors are triggered, wherein the voltage output is dimmed by the dimmer in either the leading edge AC phase cut signal or the trailing edge AC phase cut signal depending on dimming settings, wherein the firmware is programmed to activate the acoustic sensor only after the passive infrared motion sensors are activated, wherein the acoustic sensor has a triggering threshold level that is programmable via the mesh network controller.

2. The sensor lighting control system of claim 1, wherein the mesh network transceiver of the sensor lighting control system is a ZigBee mesh network control module configured to communicate with the wireless mesh network.

3. The sensor lighting control system of claim 2, wherein the ZigBee mesh network control module is configured to interpret a received dimming level command code and output an ACL-ON signal to turn ON or OFF the built-in AC phase cut MOSFETs to dim the lighting device circuit in either a leading edge forward phase or trailing edge reverse phase mode, wherein the firmware is programmed in the microcontroller memory on the mesh network.

4. The sensor lighting control system of claim 2, wherein the mesh network control module has a mesh network control module firmware configured to interpret a received minimum or lower LED dimming level command code, and to deactivate the AC phase cut dimmer at a present dimming state to avoid flickering.

5. The sensor lighting control system of claim 2, wherein the mesh network control module and the firmware calibrates an AC phase cut dimming curve which includes a linear, logarithmic, exponential, or S-Curve type AC phase cut dimming curve.

6. The sensor lighting control system of claim 2, wherein the firmware can be calibrated for smooth fade in and fade out special effects when changing an AC phase cut dimming luminance level from one level to another.

7. The sensor lighting control system of claim 2, wherein the mesh network transceiver has a built-in identification which is a media access control (MAC) address programmed into the internal ZigBee chip to provide a very high security system.

8. The sensor lighting control system of claim 2, wherein the mesh network further includes a wireless range extender, wherein the wireless mesh network has redundant and dynamic topology.

9. The sensor lighting control system of claim 2, wherein the dimmer is controlled by a different firmware timing to select an AC start in conduction for a leading edge phase cut, or an AC start in conduction for a trailing edge phase cut of each AC half-cycle.

10. The sensor lighting control system of claim 9, wherein the dimmer is implemented by a pair of N-Channel MOSFETs in opposing connections and wherein the voltage input is connected to a MOSFET drain electrode with a MOSFET source electrode connected to a bottom MOSFET source electrode in an opposing connection, wherein a bottom MOSFET drain is connected between the voltage input and an AC neutral power source, and wherein the pair of N-Channel MOSFET's are configured so that when a pair of MOSFET's gate electrodes are turned on or off at a proper timing, the AC current will pass through one MOSFET drain to source normal conduction path, and the other MOSFET will be bypassed via a built-in reverse body diode from a source electrode as anode to a drain electrode as a cathode.

11. The sensor lighting control system of claim 10, wherein the dimmer only requires a neutral and an AC source, without no additional wiring.

\* \* \* \* \*